United States Patent
Yagi et al.

(10) Patent No.: US 10,738,453 B2
(45) Date of Patent: Aug. 11, 2020

(54) TOILET DEVICE

(71) Applicant: TOTO LTD., Kitakyushu-shi, Fukuoka (JP)

(72) Inventors: Shinichi Yagi, Fukuoka-ken (JP); Tomoyasu Ichiki, Fukuoka-ken (JP); Hiroaki Amemori, Fukuoka-ken (JP); Ayumu Umemoto, Fukuoka-ken (JP); Yo Morotomi, Fukuoka-ken (JP); Masahiro Yamamoto, Fukuoka-ken (JP); Satoru Matsumoto, Fukuoka-ken (JP)

(73) Assignee: TOTO LTD., Kitakyushu-Shi, Fukuoka (JP)

( * ) Notice: Subject to any disclaimer, the term of this patent is extended or adjusted under 35 U.S.C. 154(b) by 497 days.

(21) Appl. No.: 13/766,176

(22) Filed: Feb. 13, 2013

(65) Prior Publication Data

US 2013/0205487 A1   Aug. 15, 2013

(30) Foreign Application Priority Data

Feb. 14, 2012   (JP) .................... 2012-029494

(51) Int. Cl.
   *E03D 11/13*   (2006.01)
   *E03D 9/00*   (2006.01)
   (Continued)

(52) U.S. Cl.
   CPC .............. *E03D 11/13* (2013.01); *E03D 9/00* (2013.01); *E03D 9/005* (2013.01); *C02F 1/4618* (2013.01); *C02F 5/083* (2013.01); *C02F 2303/22* (2013.01)

(58) Field of Classification Search
   CPC ........................... E03D 11/005; E03D 11/032
   (Continued)

(56) References Cited

U.S. PATENT DOCUMENTS 5,965,031 A * 10/1999 Kitz et al. .................. 210/696
6,319,390 B1 * 11/2001 Kono et al. ................ 205/701
(Continued)

FOREIGN PATENT DOCUMENTS

JP     2000144846 A     5/2000
JP     2004092278 A *   3/2004
(Continued)

OTHER PUBLICATIONS

JP2004092278A_Translation.*
JP 2009097331 A Translation.*
Japanese Office action for 2012-029494 dated Apr. 10, 2013.

*Primary Examiner* — David P Angwin
*Assistant Examiner* — William R Klotz
(74) *Attorney, Agent, or Firm* — Pearne & Gordon LLP

(57) ABSTRACT

According to an aspect of the present invention, a toilet device includes: a washing unit washing a surface of a bowl in a toilet bowl; a water supplying unit supplying washing water to the washing unit; a silicic acid polymerization inhibiting unit adding inhibitor for silicic acid polymerization to the washing water left on the surface of the bowl after the washing of the bowl, the inhibitor inhibiting polymerization of silicic acid component in the washing water left on the surface of the bowl; and a control portion executing a control starting an operation of the silicic acid polymerization inhibiting unit before the surface of the bowl is evaporated.

7 Claims, 11 Drawing Sheets

(51) Int. Cl.
*C02F 5/08* (2006.01)
*C02F 1/461* (2006.01)

(58) Field of Classification Search
USPC .......................................... 4/222, 223, 226.1
See application file for complete search history.

(56) References Cited

U.S. PATENT DOCUMENTS

| | | | |
|---|---|---|---|
| 6,332,229 B1* | 12/2001 | O'Malley et al. | 4/438 |
| 2005/0246828 A1* | 11/2005 | Shirai et al. | 4/420.4 |
| 2007/0122459 A1* | 5/2007 | Yu | A23K 1/1751 |
| | | | 424/442 |
| 2010/0242164 A1 | 9/2010 | Kwon et al. | |
| 2011/0145985 A1* | 6/2011 | Lin | 4/246.1 |
| 2012/0022192 A1* | 1/2012 | Nishida | 524/123 |
| 2012/0124726 A1* | 5/2012 | Gartner et al. | 4/321 |
| 2013/0185861 A1* | 7/2013 | Matsumoto et al. | 4/443 |

FOREIGN PATENT DOCUMENTS

| | | | | |
|---|---|---|---|---|
| JP | 2007-321371 A | | 12/2007 | |
| JP | 2007321371 A | * | 12/2007 | |
| JP | 2009097331 A | * | 5/2009 | ............ E03D 9/002 |
| TW | 272244 B | | 3/1996 | |
| WO | 2001044592 A1 | | 6/2001 | |

\* cited by examiner

UNIT: mg/L

|  | TAP WATER | ACIDIC ELECTROLYZED WATER |
|---|---|---|
| $Na^+$ | 22.7 | 15.7 |
| $K^+$ | 3.4 | 1.6 |
| $Mg^{2+}$ | 5.2 | 3.2 |
| $Ca^{2+}$ | 27.0 | 17.2 |
| $F^-$ | 0.1 | 0.2 |
| $Cl^-$ | 19.1 | 29.5 |
| $NO_3^-$ | 4.4 | 7.1 |
| $SO_4^{2-}$ | 36.3 | 53.9 |
| $Si^+$ | 6.2 | 6.0 |
| pH | 6.9 | 3.3 |

FIG. 8

| TAP WATER + NITRIC ACID | | | | | | | ACIDIC ELECTROLYZED WATER |
|---|---|---|---|---|---|---|---|
| pH1.0 | pH1.5 | pH2.0 | pH3.0 | pH4.0 | pH5.0 | pH5.5 | pH6.0 | pH3.3 |
| × | ○ | ○ | ○ | ○ | ○ | ○ | × | ○ |

FIG. 9

| Al³⁺ | TAP WATER + NITRIC ACID | | | | | |
|---|---|---|---|---|---|---|
| | pH1.0 | pH2.0 | pH3.0 | pH4.0 | pH5.0 | pH6.0 |
| 10ppm | ○ | ○ | ○ | ○ | ○ | ○ |
| 5ppm | × | ○ | ○ | ○ | ○ | ○ |
| 1ppm | × | ○ | ○ | ○ | ○ | × |
| 0.5ppm | × | ○ | ○ | ○ | ○ | × |
| 0.1ppm | × | ○ | ○ | ○ | ○ | × |

FIG. 10

| $Cu^{2+}$ | TAP WATER + NITRIC ACID | | | | | |
|---|---|---|---|---|---|---|
| | pH1.0 | pH2.0 | pH3.0 | pH4.0 | pH5.0 | pH6.0 |
| 10ppm | × | ○ | ○ | ○ | ○ | ○ |
| 5ppm | × | ○ | ○ | ○ | ○ | ○ |
| 1ppm | × | ○ | ○ | ○ | ○ | × |
| 0.5ppm | × | ○ | ○ | ○ | ○ | × |
| 0.1ppm | × | ○ | ○ | ○ | ○ | × |

FIG. 11

|         | ACIDIC ELECTROLYZED WATER (pH3.3) ||
|---------|-----------|-----------|
|         | $Al^{3+}$ | $Cu^{2+}$ |
| 10ppm   | ◯ | ◯ |
| 5ppm    | ◯ | ◯ |
| 1ppm    | ◯ | ◯ |
| 0.5ppm  | ◯ | ◯ |
| 0.1ppm  | ◯ | ◯ |

FIG. 12

| TILE | FIRST TILE | SECOND TILE |
|---|---|---|
| EVAPORATION CONDITION | EVAPORATION AT ROOM TEMPERATURE FOR 30 MINUTES (WITHOUT UV IRRADIATION) | EVAPORATION AT ROOM TEMPERATURE FOR 30 MINUTES (WITH UV IRRADIATION) |
| PHOTOGRAPH | | |
| SCHEMATIC VIEW OF WATER SCALE | WATER SCALE | WATER SCALE |

FIG. 13

TOILET DEVICE

CROSS-REFERENCE TO RELATED APPLICATIONS

This application is based upon and claims the benefit of priority from the prior Japanese Patent Application No. 2012-029494, filed on Feb. 14, 2012; the entire contents of which are incorporated herein by reference.

FIELD

The present invention generally relates to a toilet device.

BACKGROUND

When water residual on a bowl surface is evaporated after washing the bowl surface of a closet bowl or a urinal by washing water and the bowl surface is evaporated, water scale may be attached to the bowl surface. If the water scale is attached to the bowl surface, the bowl surface is smeared. Further, since the water scale is robustly attached to the bowl surface, the water scale cannot be removed without difficulties. Therefore, there is a demand for a technique of inhibiting formation of the water scale, or a technique which can easily remove the water scale even in the case that the water scale is attached to the bowl surface. Further, the water scale of silicic acid component is adhered to a glaze surface of a toilet bowl more robustly than the water scale such as calcium component and magnesium component. Accordingly, there is strongly desired a technique which can easily remove the water scale of the silicic acid component.

There has been proposed a sanitary washing device which previously removes calcium ions and magnesium ions which form the water scale component (JP-A-2004-270185). However, the sanitary washing device described in JP-A-2004-270185 has a problem that the device becomes large in size.

Further, there has been proposed a sterilized raw tap water supply type washing household equipment which forms sterilized raw tap water having hydrogen ion concentration between pH 4 and pH 6, and supplies the sterilized raw tap water to a subject to be washed (JP-A-H07 (1995)-136660A). Further, there has been proposed a water washing type closet bowl which delivers function water to the bowl portion after a predetermined time has passed after a washing operation (JP-A-2004-92278). However, JP-A-H07 (1995)-136660 and JP-A-2004-92278 do not have any description about the water scale of the silicic acid component, and there is room for improvement in a point of inhibition of the formation of the water scale or a point of easy removal of the water scale.

SUMMARY

According to an aspect of the present invention, a toilet device includes: a washing unit washing a surface of a bowl in a toilet bowl; a water supplying unit supplying washing water to the washing unit; a silicic acid polymerization inhibiting unit adding inhibitor for silicic acid polymerization to the washing water left on the surface of the bowl after the washing of the bowl, the inhibitor inhibiting polymerization of silicic acid component in the washing water left on the surface of the bowl; and a control portion executing a control starting an operation of the silicic acid polymerization inhibiting unit before the surface of the bowl is evaporated.

BRIEF DESCRIPTION OF THE DRAWINGS

FIG. 8 is a table showing results obtained by analyzing water quality of tap water and acidic electrolyzed water;

FIG. 9 is a table exemplifying one example of results obtained by evaluating water scale removing capability in the present experiments;

FIG. 10 is a table exemplifying one example of the results obtained by evaluating the water scale removing capability in the present experiments;

FIG. 11 is a table exemplifying one example of the results obtained by evaluating the water scale removing capability in the present experiments;

FIG. 12 is a table exemplifying one example of the results obtained by evaluating the water scale removing capability in the present experiments;

FIG. 13 is a comparative table of the water scale formation in relation to irradiation of ultraviolet lights;

DETAILED DESCRIPTION

Figure 1:
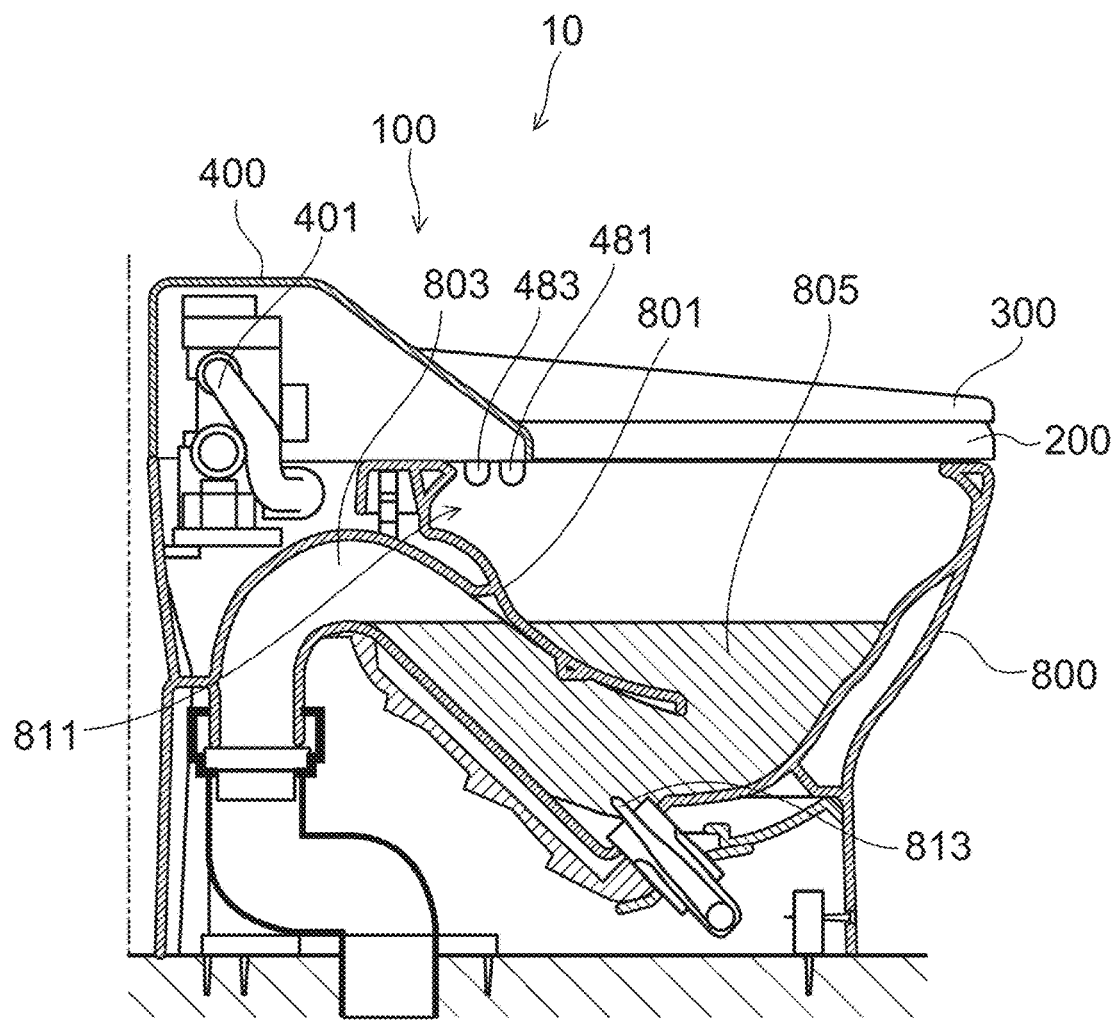
FIG. 1 is a cross sectional schematic view showing a toilet device according to an embodiment of the present invention.

According to a first aspect of the present invention, a toilet device includes: a washing unit washing a surface of a bowl in a toilet bowl; a water supplying unit supplying washing water to the washing unit; a silicic acid polymerization inhibiting unit adding inhibitor for silicic acid polymerization to the washing water left on the surface of the bowl after the washing of the bowl, the inhibitor inhibiting polymerization of silicic acid component in the washing water left on the surface of the bowl; and a control portion executing a control starting an operation of the silicic acid polymerization inhibiting unit before the surface of the bowl is evaporated.

The water scale robustly attached to the surface of the bowl is formed by polymerization of the silicic acid component in the residual water left on the surface of the bowl. According to the present invention, the inhibitor for silicic acid polymerization can be added to the washing water left on the surface of the bowl before the surface of the bowl is evaporated. Accordingly, the polymerization of the silicic acid component can be inhibited, and the formation of the water scale can be inhibited. Further, the water scale can be accordingly separated (removed) with a simple cleaning operation.

Further, a second aspect of the present invention provides the toilet device according to the first aspect of the present invention, wherein the inhibitor for silicic acid polymerization is constituted by acidic water.

According to the toilet device, progress of the polymerization of silicic acid component in the residual water can be inhibited. In other words, if the residual water is evaporated in a state in which the silicic acid is not polymerized and the surface of the bowl is evaporated, a coffee stain phenomenon occurs in a neutral area. The polymerization of the silicic acid is progressed in the process. On the other hand, the coffee stain phenomenon does not occur in an acid area. Then, a solvent flows in a center direction and there is generated a state in which the silic acid is not polymerized. Accordingly, the progress of the polymerization of the silicic acid component in the residual water can be inhibited, and the formation of the water scale can be inhibited. Further, the formed water scale can be easily removed.

Further, a third aspect of the present invention provides the toilet device according to the second aspect of the present invention, wherein the acidic water includes metal ion.

According to the toilet device, when the metal ion is added to the acidic water, the metal ion is interposed between silicic acid ($SiO_2$) molecules in the formed water scale. Further, if the water is supplied by washing operation, the metal ion is eluted. Then, an aggregate of silicic acid is further weakened, and the water scale can be easily removed.

Further, a fourth aspect of the present invention provides the toilet device according to the second aspect of the present invention, wherein acidity of the acidic water is pH 2.5-5.0.

Further, a fifth aspect of the present invention provides the toilet device according to the third aspect of the present invention, wherein acidity of the acidic water is pH 2.5-5.0.

According to the toilet device, since the acidity of the acidic water is between pH 2.5 and pH 5.0, the acidic water can be generated by an electrolysis tank which electrolyzes the water. Therefore, any maintenance, for example, replenishment of medical agents is not required. Further, the acidic water having the acidity between pH 2.5 and pH 5.0 can adjust the acidity of the residual water left on the surface of the bowl, for example, to about pH 2.5 and pH 5.0.

Further, a sixth aspect of the present invention provides the toilet device according to the first aspect of the present invention, wherein a photocatalyst layer is formed on the surface of the bowl.

Further, a seventh aspect of the present invention provides the toilet device according to the second aspect of the present invention, wherein a photocatalyst layer is formed on the surface of the bowl.

Further, an eighth aspect of the present invention provides the toilet device according to the third aspect of the present invention, wherein a photocatalyst layer is formed on the surface of the bowl.

Further, a ninth aspect of the present invention provides the toilet device according to the forth aspect of the present invention, wherein a photocatalyst layer is formed on the surface of the bowl.

According to the toilet device, since the photocatalyst layer is formed on the surface of the bowl, a photocatalyst is excited by irradiating ultraviolet light onto the surface of the bowl so as to generate an oxidation reduction reaction. As a result, a decomposition activity and a hydrophilization action can be obtained, the decomposition activity decomposing organic matters, for example, germs, bacteria and odorant, and the hydrophilization action making the surface easily get a wetting. Since the bowl forming the photocatalyst layer can inhibit from being attached, can decompose the sewage or can easily remove the attached water scale, a cleaning load of the toilet bowl can be lightened, and a clean toilet bowl can be maintained. Further, since the water scale can be easily removed by adding the inhibitor for silicic acid polymerization to the washing water left on the surface of the bowl, the ultraviolet light can be inhibited from not being irradiated onto the photocatalyst layer under the water scale. Therefore, the activity of the photocatalyst can be inhibited from being lowered.

According to the aspect of the present invention, there is provided the toilet device which can inhibit the formation of the water scale, or easily remove the water scale.

Figure 2:
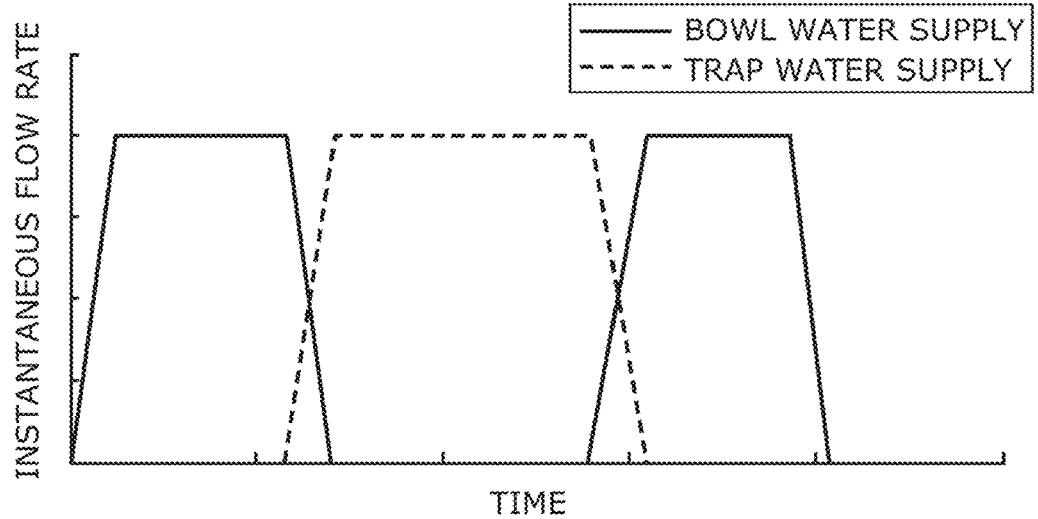
FIG. 2 is a graph exemplifying one example of a washing operation of the toilet device according to the present embodiment.

Hereinafter, preferred embodiments of the present invention will be described with reference to the drawings. In each of the drawings, the same reference numerals are attached to the same constituting elements, and a detailed description thereof will be appropriately omitted. FIG. 1 is a cross sectional schematic view showing a toilet device according to an embodiment of the present invention. Further, FIG. 2 is a graph exemplifying one example of a washing operation of the toilet device according to the present embodiment.

A toilet device 10 shown in FIG. 1 has a sanitary washing device 100 which is provided on a western style sitting toilet bowl (hereinafter, simply refer to as "toilet bowl" as a matter of convenience for description) 800. The toilet bowl 800 has a bowl 801. The toilet bowl 800 is provided with a washing unit for washing a surface of the bowl 801. Further, the toilet bowl 800 is provided with a trap 803, a bowl water supply port 811, and a trap water supply port 813. The sanitary washing device 100 has a casing 400, a toilet seat 200 and a toilet lid 300. The toilet seat 200 and the toilet lid 300 are pivotally supported respectively so as to be freely opened and closed in relation to the casing 400. The toilet lid 300 may not be necessarily provided.

An inner portion of the casing 400 is provided with a washing water supply device (a water supply unit) which supplies washing water. Further, for example, a lower portion of the casing 400 is provided with a spray nozzle (a spray portion) which sprays clean water or an inhibitor for silicic acid polymerization to a surface of the bowl 801 of the toilet bowl 800, and an UV light source 483 which irradiates ultraviolet light (UV) to the bowl 801. A spray nozzle 481 and the UV light source 483 may be provided in an inner portion of the casing 400, or may be additionally provided in an outer portion of the casing 400.

In the specification of the present application, it is assumed that "water" includes hot water which is heated, in addition to cold water. Further, the inhibitor for silicic acid polymerization will be mentioned in detail later.

As shown in FIG. 2, when a user carries out an operation for washing the toilet bowl, or when the washing operation of the toilet bowl is automatically executed based on a predetermined time elapse after the user stands up from the toilet seat 200, an instantaneous flow rate of the washing water supplied to the bowl 801 from the bowl water supply port 811 is increased. For example, the bowl water supply port 811 delivers the washing water along an upper edge of the bowl 801 (a rim water delivery).

Subsequently, when a predetermined time has passed, the instantaneous flow rate of the washing water delivered from the bowl water supply port 811 is reduced. On the other hand, the instantaneous flow rate of the washing water supplied to the trap 803 from the trap water supply port 813 is increased. For example, the trap water supply port 813 delivers the washing water toward the trap 803 (a jet water delivery).

Based on the rim water delivery and the jet water delivery, the washing water delivered to the bowl 801 is filled in the trap 803 while carrying out the washing operation of the bowl 801. Accordingly, siphon is generated. Further, the washing water delivered to the trap 803 discharges sewage in a reserved water 805 to an outer side through the trap 803.

Subsequently, when a predetermined time has passed, the instantaneous flow rate of the washing water supplied to the trap 803 from the trap water supply port 813 is reduced. On the other hand, the instantaneous flow rate of the washing water supplied to the bowl 801 from the bowl water supply port 811 is increased. Accordingly, the reserved water 805 is secured.

The washing operation mentioned above is only an example of the washing operation of the toilet device according to the present embodiment, and the washing operation is not limited to this.

Here, if the residual water left in the bowl 801 after the end of the washing operation evaporates and the surface of the bowl 801 is evaporated, the water scale may be attached to the bowl 801. Normally, if a silicic acid concentration is increased in the process of the evaporation of the water content in the residual water, polymerization of the silicic acid is promoted. Accordingly, a coffee stain phenomenon (a phenomenon that a solute flows toward a contour of liquid droplets so as to be deposited like a ring form based on evaporation of solvent in the liquid droplets) occurs and a robust water scale is formed. If the water scale is attached to the bowl 801, the bowl 801 smears. Further, since the water scale is robustly attached to the bowl 801, removal of the water scale is difficult.

On the contrary, the toilet device 10 according to the present embodiment is provided with a silicic acid component polymerization inhibiting unit for spraying an inhibitor for silicic acid polymerization to the surface of the bowl 801 before the surface of the bowl 801 is evaporated. The inhibitor for silicic acid polymerization is constituted, for example, by water solution (acidic water) having high acidity including a metal ion. In other words, the toilet device 10 according to the present embodiment substitutes the residual water left in the bowl 801 with the water solution having the high acidity including the metal ion. Alternatively, the toilet device 10 according to the present embodiment adds the water solution having the high acidity or the water solution having the acidity including the metal ion to the residual water left in the bowl 801. Accordingly, the polymerization of the silicic acid can be inhibited, and formation of the water scale can be inhibited. Further, the formed water scale can be easily removed.

These effects can be obtained by the following reasons. However, these are only assumption or tentative theory based on the knowledge obtained by the inventors of the present invention, and the reasons are not limited to them in the present embodiment.

When the acidity of the residual water is increased, progress of the polymerization of the silicic acid in the residual water can be inhibited. Then, the coffee stain phenomenon does not occur even if the solute concentration is increased in the process of the evaporation of the water content, so that a phenomenon that the solvent flows in a center direction is observed. Further, it is confirmed that an adhesion force between the formed water scale and a base material is small, and the water scale can be easily separated. Further, the effect that the formation of the water scale is inhibited, and the formed water scale can be easily removed can be obtained in the case that calcium ion components and magnesium ion components are included in the water scale, in addition to the water scale containing the silicic acid component.

The acidity of the acidic water is, for example, between about pH 2.5 and about pH 5.0. As long as the acidic water has the acidity in this range, the acidic water can be generated by an electrolysis tank (for example, refer to FIG. 3) which electrolyzes the water. Accordingly, any maintenance, for example, replenishment of medical agent is not required. Further, the acidic water including the metal ion having the acidity between about pH 2.5 and about pH 5.0 can adjust the acidity of the residual water, for example, to about pH 2.5 to about pH 5.0 (preferably pH 2.0 to pH 5.0). The acidity may be adjusted in a range between pH 1.5 and pH 5.5. Accordingly, the polymerization of the silicic acid can be inhibited. As a result, formation of the water scale can be inhibited, and the formed water scale can be easily removed. Since $SiO_2$ dissolved in the water having a high acidity mainly exists in a state of monomers or a low degree of polymerization such as dimers, it is assumed that the polymerization is inhibited even if the water content evaporates. On the other hand, in the water solution having the acidity smaller than pH 1.5 and the water solution having the acidity larger than pH 5.5, a rate of existence of the monomers or dimers is low. In other words, the silicic acid is assumed to be polymerized.

Further, in the case that the metal ion is added to the acidic water, the metal ion included in the acidic water is constituted, for example, by aluminum ion ($Al^{3+}$) or copper ion ($Cu^{2+}$). If the metal ion is added to the acidic water, the metal ion is imposed between silicic acid ($SiO_2$) molecules in the formed water scale. Further, when the water is supplied by the washing operation, the metal ion is eluted. Then, it is thought that aggregation of silicic acid is further weakened and the water scale can be easily removed. An adding amount of the metal ion is set to about 0.1 ppm, preferably between about 1.0 ppm and about 5.0 ppm in relation to the residual water.

Figure 3:
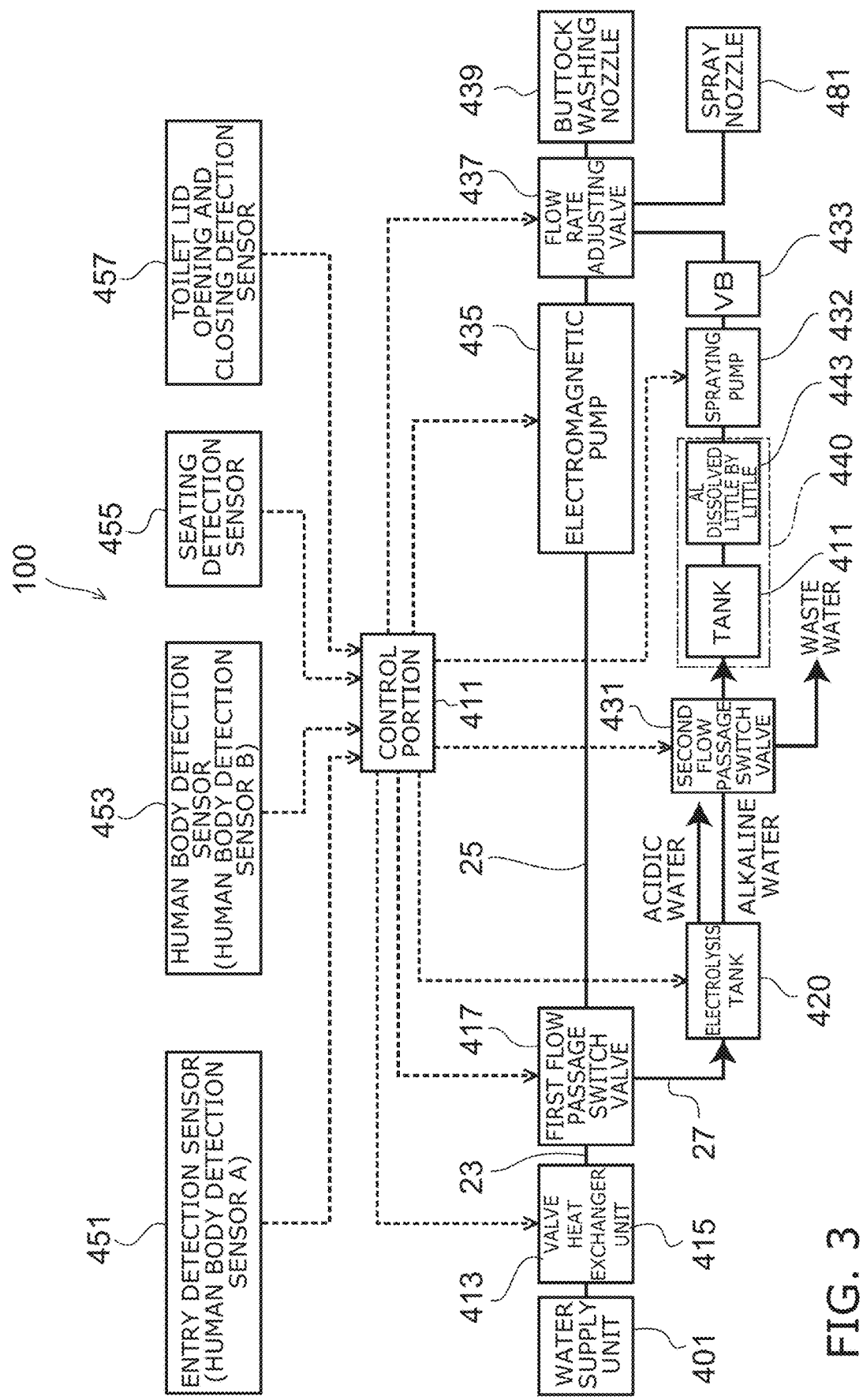
FIG. 3 is a block diagram showing a structure of a substantial part of the toilet device according to the present embodiment.
Figure 4A:
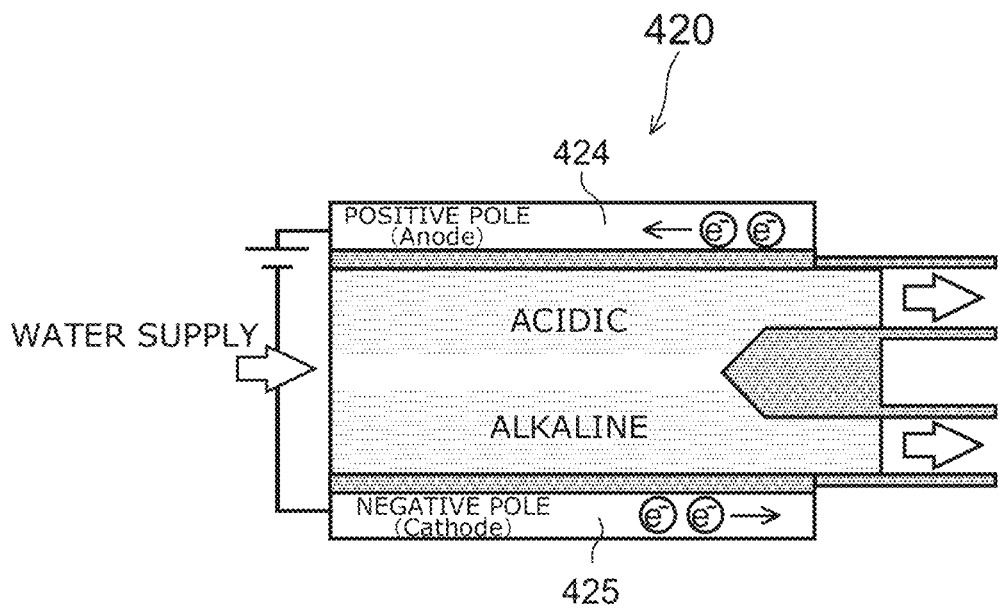
FIGS. 4A and 4B are cross sectional schematic views exemplifying an electrolysis tank and a metal ion water generating portion according to the present embodiment.
Figure 4B:
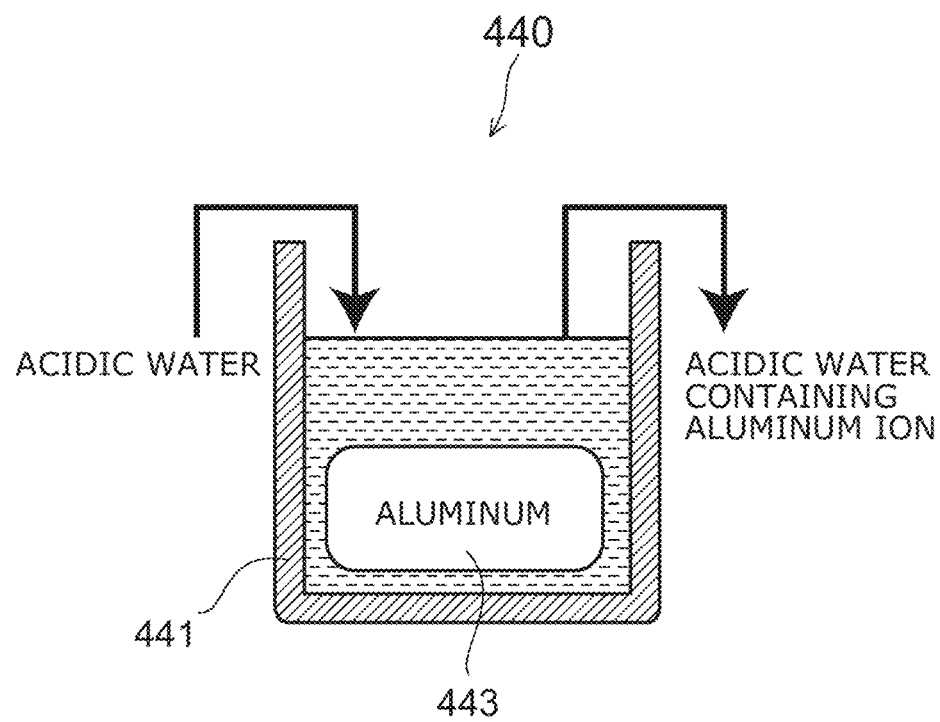

Next, a description will be further given of the toilet device 10 according to the present embodiment with reference to the accompanying drawings. FIG. 3 is a block diagram showing a structure of a substantial part of the toilet device according to the present embodiment. Further, FIGS. 4A and 4B are cross sectional schematic views exemplifying an electrolysis tank and a metal ion water generating portion according to the present embodiment.

FIG. 3 shows a structure of a substantial part in a water passage system and an electric system. Further, FIG. 4A exemplifies the electrolysis tank according to the present embodiment. FIG. 4B exemplifies the metal ion water generating portion according to the present embodiment.

As shown in FIG. 3, the sanitary washing device 100 provided in the toilet device 10 according to the present embodiment has a main water passage 23 which guides the water supplied from a water supply unit 401 to a buttock washing nozzle 439 or the spray nozzle 481. A valve 413 and a heat exchanger unit 415 are provided in an upstream side of the main flow passage 23. The valve 413 is an electromagnetic valve which can be opened and closed, and controls the water supply based on a command from a control portion 411 provided in an inner portion of a casing 400. The heat exchanger unit 415 has a warm water heater (not shown), and heats up the supplied water to form a predetermined warm water.

A first flow passage switch valve 417 is provided in a downstream side of the valve 413 and the heat exchanger unit 415. The first flow passage switch valve 417 carries out opening and closing operations of the water supply to the buttock washing nozzle 439 and the spray nozzle 481 and a switching operation thereof. The main flow passage 23 is branched into a first flow passage 25 which guides the washing water to the buttock washing nozzle 439 and a second flow passage 27 which guides the washing water or the inhibitor for silicic acid polymerization to the spray nozzle 481, by the first flow passage switch valve 417.

An electrolysis tank (a silicic acid component polymerization inhibiting unit) 420 is provided in an upstream side of the second flow passage 27. The electrolysis tank 420 can generate the acidic water and the alkaline water. A description will be further given here of the electrolysis tank 420 with reference to the accompanying drawings.

As shown in FIG. 4A, the electrolysis tank 420 according to the present embodiment has an anode plate 424 and a cathode plate 425 in its inner portion, and can electrically decompose the tap water flowing through a space (a flow passage) between the anode plate 424 and the cathode plate 425 based on a current application control from the control portion 411. At this time, acid ($H^+$) is consumed in the cathode plate 425, and pH rises in the vicinity of the cathode plate 425. In other words, the alkaline water is generated in the vicinity of the cathode plate 425. On the other hand, alkali ($OH^-$) is consumed in the anode plate 424, and pH decreases in the vicinity of the anode plate 424. In other words, the acidic water is generated in the vicinity of the anode plate 424.

Describing while turning back to FIG. 3, the acidic water and the alkaline water generated in the electrolysis tank 420 are respectively guided to a second flow passage switch 431 provided in a downstream side of the electrolysis tank 420 by different flow passages. The second flow passage switch valve 431 guides the acidic water supplied from the electrolysis tank 420 to a metal ion water generating portion (a silicic acid component polymerization inhibiting unit) 440 which is provided in a downstream side of the second flow passage switch valve 431. On the other hand, the second flow passage switch valve 417 circulates the alkaline water supplied from the electrolysis tank 420 as waste water into sewage. Alternatively, the second flow passage switch valve 417 may circulate the alkaline water supplied from the electrolysis tank 420 into the toilet bowl 800 in a range that does not inhibit the water scale inhibiting effect according to the present embodiment. In the case that only the acidic water is used as the inhibitor for silicic acid polymerization (the case that the acidic water including no metal ion is used), a metal (aluminum) mentioned later may be excluded.

In order to inhibit the scale of calcium carbonate from being formed in the electrolysis tank 420, a control portion 511 may carry out an inversion (a pole change (PC)) which switches the anode plate 424 and the cathode plate 425. Then, in the case that the second flow passage switch valve 431 is not provided, the flow passages respectively guiding the acidic water and the alkaline water are switched each other, and the alkaline water is guided to the metal ion water generating portion. Therefore, the second flow passage switch valve 431 has a function of switching the flow passages so as to guide the acidic water to the metal ion water generating portion in the case that the inversion is carried out in the electrolysis tank 420.

A description will be given here of the metal ion water generating portion 440 with reference to the accompanying drawings.

In the present embodiment, the description will be given by exemplifying the case that the metal ion dissolved in the metal ion water generating portion 440 is constituted by aluminum ion ($Al^{3+}$).

As shown in FIG. 4B, the metal ion water generating portion 440 according to the present embodiment has a tank 441, and an aluminum 443 which is installed within the tank 441. The acidic water supplied from the electrolysis tank 420 via the second flow passage switch valve 431 is reserved within the tank 441. Further, the aluminum 443 installed within the tank 441 is in a state in which the aluminum 443 is immersed by the acidic water reserved in the tank 441.

Then, the aluminum 443 immersed in the acidic water is dissolved (dissolved little by little), for example, for about 1 to 2 hours. Accordingly, the acidic water within the tank 441 comes to the acidic water containing aluminum ions. In other words, the water solution having the high acidity containing the metal ion ($Al^{3+}$ in the present embodiment) is generated in the metal ion water generating portion 440.

Describing while turning back to FIG. 3, the acidic water containing the aluminum ions which is generated by the metal ion water generating portion 440 is sucked by a spraying pump (a silicic acid component polymerization inhibiting unit) 432 and is guided to a flow rate adjusting valve 437 via a vacuum breaker (VB) 433. The flow rate adjusting valve 437 sets a supply end of the acidic water to the spray nozzle 481 as well as adjusting a water momentum (a flow rate), and guides the acidic water to the spray nozzle 481. The spray nozzle 481 sprays the acidic water supplied from the flow rate adjusting valve 437 to the bowl 801.

On the other hand, the washing water guided to the first flow passage 25 in the first flow passage switch valve 417 is guided to the buttock washing nozzle 439 via the electromagnetic pump 435 and the flow rate adjusting valve 437. Then, the washing water is sprayed toward "buttock" of the user seated on the toilet seat 200 from a water delivery port (not shown) which is provided in the buttock washing nozzle 439.

Further, as shown in FIG. 3, the sanitary washing device 100 according to the present embodiment has an entry detection sensor (a human body detection sensor A) 451, a human body detection sensor (a human body detection sensor B) 453, a seating detection sensor 455, and a toilet lid opening and closing detection sensor 457.

The entry detection sensor 451 can detect a user just after opening a door of a toilet room so as to enter, and a user existing in front of the door for entering into the toilet room. In other words, the entry detection sensor 451 can detect the user before entering into the toilet room, that is, the user existing in front of the door outside the toilet room, in addition to the user entering into the toilet room. As the entry detection sensor 451 mentioned above, a pyroelectric sensor and a microwave sensor such as a Doppler sensor can be used. In the case of using a sensor utilizing a Doppler effect of the microwave, and a sensor detecting a detected body based on amplitude (intensity) of the microwave reflected by transmitting the microwave, existence of the user can be detected over the door of the toilet room. In other words, the user before entering into the toilet room can be detected.

The human body detection sensor 453 can detect the user existing in front of the toilet bowl 800, that is, the user existing at a position which is away forward from the toilet seat 200. In other words, the human body detection sensor 453 can detect the user entering into the toilet room and coming close to the toilet seat 200. As the human body detection sensor 453, for example, an infrared light emitting and accepting type distance measuring sensor can be used.

The seating detection sensor 455 can detect human body existing above the toilet seat 200 just before the user seats on the toilet seat 200, and the user seated on the toilet seat 200. In other words, the seating detection sensor 455 can detect the user existing above the toilet seat 200 in addition to the user seated on the toilet seat 200. As the seating detection sensor 455, for example, the infrared light emitting and accepting type distance measuring sensor can be used.

The toilet lid opening and closing detection sensor 457 can detect an opening and closing state of the toilet lid 300. As the toilet lid opening and closing detection sensor 457, for example, combination between hall IC and magnet, or a micro switch can be used.

The control portion 411 can control an operation of the electrolysis tank 420, the spraying pump 432 and the flow rate adjusting valve 437 based on signals from the entry detection sensor 451, the human body detection sensor 453, the seating detection sensor 455 and the toilet lid opening and closing detection sensor 457.

Next, a description will be given of a specific example of the operation of the toilet device 10 according to the present embodiment with reference to the accompanying drawings.

Figure 5:
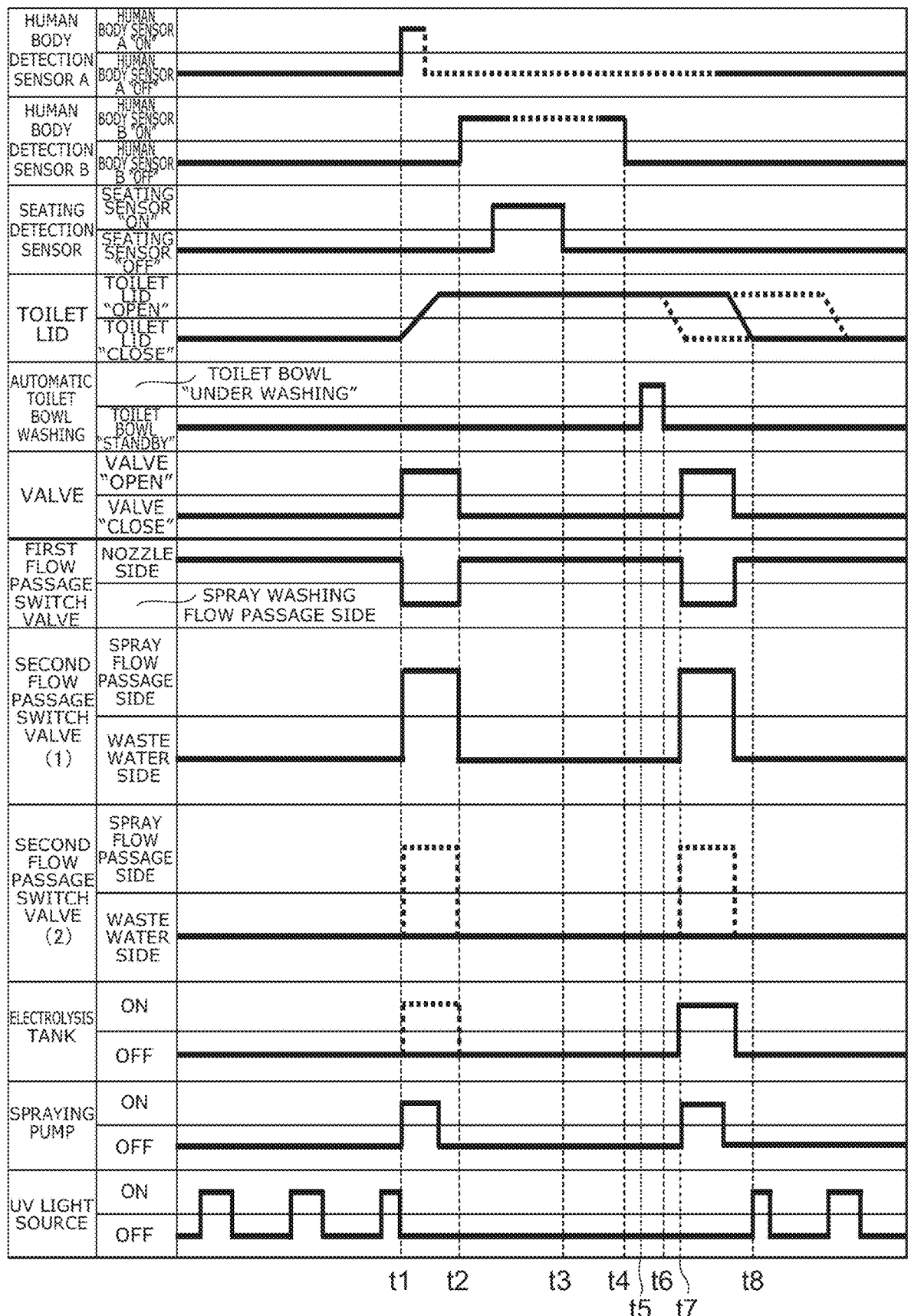
FIG. 5 is a tinning chart exemplifying a specific example of an operation of the toilet device according to the present embodiment.

FIG. 5 is a timing chart exemplifying the specific example of the operation of the toilet device according to the present embodiment.

First of all, before the entry detection sensor (the human body detection sensor A) 451 detects the user entering into the toilet room, the UV light source 483 irradiates the ultraviolet light onto the bowl 801 for a predetermined time (before timing t1). This is provided for activating the photocatalyst or maintaining the activity of the photocatalyst in the case that the photocatalyst layer is formed on the surface of the bowl 801. In the present specification, "photocatalyst" means a structure in which at least any one of an oxidation process and a reduction process is promoted by irradiating the light. Alternatively, "photocatalyst" means a structure in which hydrophilicity is improved by irradiating the light.

As a material of "photocatalyst", for example, metal oxides can be employed. As the oxides mentioned above, for example, a titanium oxide (TiOx), a zinc oxide (ZnOx) and a tin oxide (SnOx) can be listed up. Among them, the titanium oxide is particularly active as the photocatalyst, and is excellent in points of a stability and a safety.

The photocatalyst is excited so as to generate an oxidation reduction reaction by being irradiated the ultraviolet light. As a result, there can be obtained a decomposition activity which decomposes organic matters such as germs, bacteria and odorant, and a hydrophilization action which makes the surface be easily wetted by the water. Since the bowl 801 forming the photocatalyst layer can inhibit the sewage from being attached, decompose the sewage and easily remove the attached water scale, a cleaning load of the toilet bowl 800 can be lightened, and a clean toilet bowl 800 can be maintained.

In the present specification, "ultraviolet light" means the light having a wavelength which is shorter than visible light and longer than soft X-ray. Specifically, it means the light having a wavelength between 10 nanometers and 400 nanometers.

Subsequently, when the entry detection sensor 451 detects the user entering into the toilet room, the toilet lid 300 opens, the valve 413 opens, the first flow passage switch valve 417 is switched to a side of the second flow passage 27, and the second flow passage switch valve 431 is switched to a side of the metal ion water generating portion 440 (timing t1). Further, an operation of the spraying pump 432 sucking the washing water (the tap water) or the acidic water from the tank 441 of the metal ion water generating portion 440 is started (timing t1). Accordingly, the tap water is sprayed onto the surface of the bowl 801. As mentioned above, the sewage attached to the surface of the bowl 801 can be reduced by wetting the surface of the bowl 801 before the user uses the toilet bowl 800.

When the entry detection sensor 451 detects the user entering into the toilet room as shown by a broken line in field "electrolysis tank" in FIG. 5, the current application to the electrolysis tank 420 may be started and the acidic water may be generated (timing t1). In this case, the acidic water (or the acidic water including the metal ion) is sprayed onto the surface of the bowl 801. Accordingly, the sewage and the water scale which are attached to the surface of the bowl 801 can be further reduced.

Subsequently, when the human body detection sensor (the human body detection sensor B) 453 detects the user existing in front of the toilet bowl 800, the valve 413 closes, the first flow passage switch valve 417 is switched to a side of the first flow passage 25, and the second flow passage switch valve 431 is switched to a side of the waste water (timing t2). Subsequently, when about 5 seconds, for example, has passed after the seating detection sensor 455 detects leaving of the user from the toilet seat 200 (timing t3), the washing operation of the toilet bowl is started (timing t5). The operation of the toilet bowl washing is as mentioned above, for example, in relation to FIG. 2.

Subsequently, when a predetermined time T has passed after the end of the toilet bowl washing (timing t6), the valve 413 opens, the first flow passage switch valve 417 is switched to a side of the second flow passage 27, and the second flow passage switch valve 431 is switched to a side of the metal ion water generating portion 440 (timing t7). Further, the current application to the electrolysis tank 420 is started, and the operation of the spraying pump 432 is started (timing t7). Accordingly, the acidic water including the metal ion is sprayed onto the surface of the bowl 801.

The predetermined time T from the end of the toilet bowl washing (timing t6) to the spray of the acidic water including the metal ion onto the surface of the bowl 801 (timing t7) is set to a time for which the surface of the bowl 801 does not evaporate, specifically, about 30 seconds to about 30 minutes, for example. According to the knowledge obtained by the inventors of the present invention, one example of the time about 30 minutes after the end of the toilet bowl washing is a time for which the surface of the bowl of the toilet bowl forming the glaze layer on its surface starts evaporating. Accordingly, the polymerization of the silicic acid can be inhibited and the formation of the water scale can be inhibited. Further, the formed water scale can be easily removed.

As mentioned above, in the present specific example, when the predetermined time T has passed (timing t7) after the seating detection sensor 455 detects the user leaving from the toilet seat 200 (timing t3) and the end of the toilet bowl washing (timing t6), the acidic water including the metal ion is sprayed onto the surface of the bowl 801. Accordingly, the spray of the acidic water including the metal ion and the application of the acidic water onto a hip portion of the user can be avoided, when the user seats on the toilet seat 200.

Subsequently, when about 90 seconds, for example, have passed after the human body detection sensor 453 does not detect the user existing in front of the toilet bowl 800 (timing t4), the toilet lid 300 closes, and the UV light source 483 periodically irradiates the ultraviolet light onto the bowl 801 for a predetermined time (after timing t8). As mentioned above, in the present specific example, irradiation of the ultraviolet light from the UV light source 483 is started (timing t8) after the spray of the acidic water including the metal ion is started (timing t7). Accordingly, reduction of the activity of the photocatalyst can be inhibited.

In other words, according to the knowledge obtained by the inventors of the present invention, if the water scale is formed on the surface of the photocatalyst layer, the ultraviolet light is not irradiated onto the photocatalyst layer under the water scale. Therefore, there is a case that the activity of the photocatalyst is significantly lowered. Further, when the ultraviolet light is irradiated onto a water film in a state in which the water film of the tap water is formed, the polymerization of the silicic acid is promoted. Accordingly, the water scale robustly adhered to the photocatalyst layer is formed. This will be mentioned in detail later. Accordingly, the activity of the photocatalyst at the position is significantly lowered, and there is a case that the activity cannot be restored. On the contrary, in the present specific example, since the irradiation of the ultraviolet light from the UV light source 483 is started after the start of the spray of the acidic water including the metal ion, the polymerization of the silicic acid component can be inhibited.

The timing of the irradiation of the ultraviolet light may lap over the timing of the spray of the acidic water including the metal ion. Specifically, the irradiation of the ultraviolet light may be started during the spray of the acidic water including the metal ion. Further, the spray of the acidic water including the metal ion may be started during the irradiation of the ultraviolet light as long as the formation of the water scale can be inhibited.

Further, in the present specific example, there is shown the example of the toilet device in which the photocatalyst layer is formed on the surface of the bowl 801 of the toilet bowl 800, however, in the case that the photocatalyst layer is not formed on the surface of the bowl 801, the irradiation of the ultraviolet light is not necessary.

Next, a description will be given of a modified example of the operation of the toilet device 10 according to the present embodiment with reference to the accompanying drawings.

Figure 6:
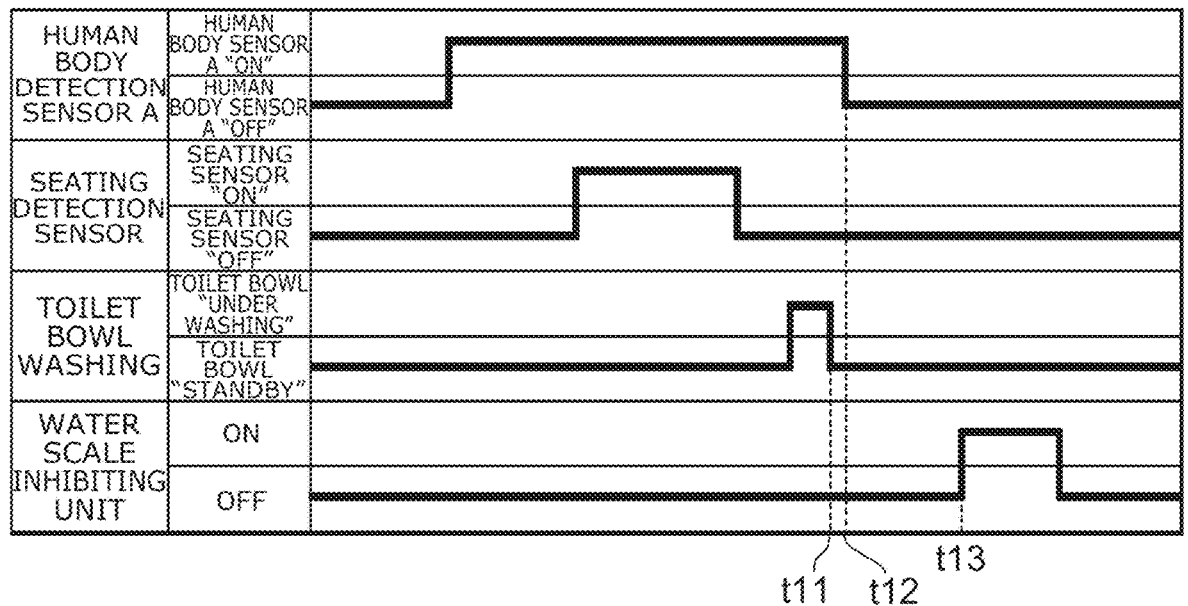
FIG. 6 is a tinning chart exemplifying a modified example of the operation of the toilet device according to the present embodiment.

FIG. 6 is a timing chart exemplifying the modified example of the operation of the toilet device according to the present embodiment.

Figure 7:
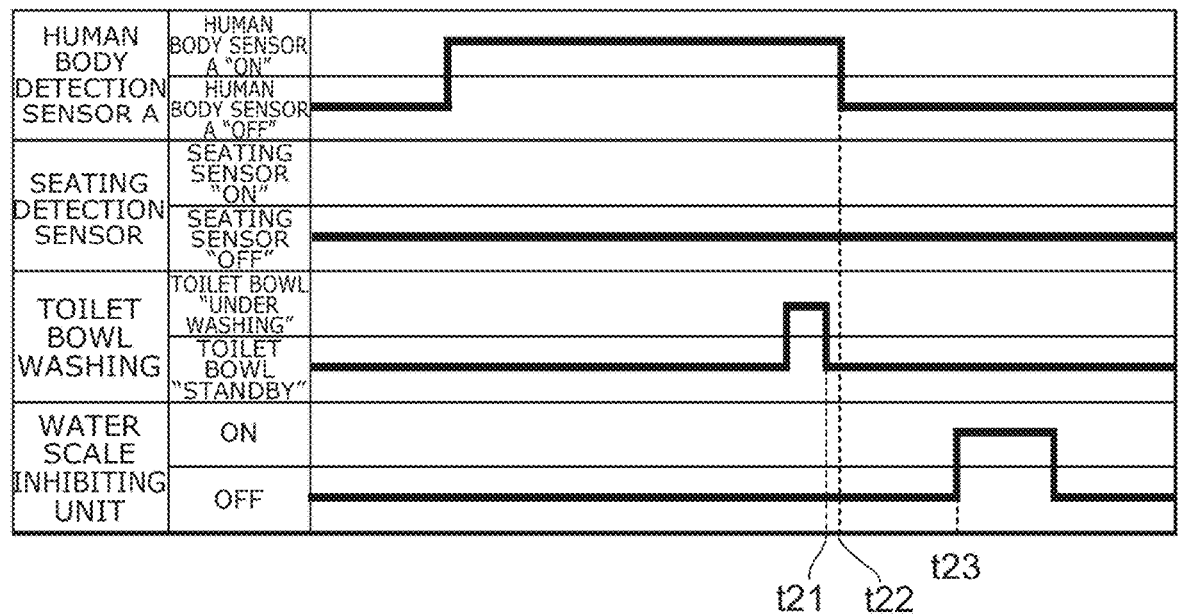
FIG. 7 is a tinning chart exemplifying the other modified example of the operation of the toilet device according to the present embodiment.

Further, FIG. 7 is a timing chart exemplifying the other modified example of the operation of the toilet device according to the present embodiment.

The modified example of the timing chart shown in FIG. 6 is an example in the case that the user carries out an excreting action of stool. The modified example of the timing chart shown in FIG. 7 is an example in the case that the user carries out an excreting action of urine or a cleaning action of the toilet. Accordingly, in the timing chart shown in FIG. 6, the seating detection sensor 455 detects the user seated on the toilet seat 200. On the other hand, in the timing chart shown in FIG. 7, the seating detection sensor 455 does not detect the user seated on the toilet seat 200.

In the modified examples shown in FIGS. 6 and 7, when a predetermined time T has passed from the end of the toilet bowl washing (timing t11) after the entry detection sensor 451 does not detect the user (timing n2), the operation of the water scale inhibiting unit (the electrolysis tank 420 and the spraying pump 432) is started (timing n3). The predetermined time T is as mentioned above in relation to FIG. 5. As mentioned above, the spray of the acidic water including the metal ion may be carried out after the user or cleaning person gets out of the toilet room. Accordingly, the application of the acidic water including the metal ion on the human body can be more securely avoided.

In the specific example mentioned above with regard to FIGS. 5 to 7, the spray of the acidic water is started when the predetermined time T has passed after the end of the washing operation of the toilet bowl. This can be achieved by detecting the end of the washing operation of the toilet bowl, even in the case of the sanitary washing device of the type that the sanitary washing device 100 is later attached to the existing toilet bowl 800. Further, the start timing of the spray of the acidic water is not limited to this. For example, the spray of the acidic water may be started at an elapsing time of the predetermined time T after the seating detection sensor 455 detects the user leaving from the toilet seat 200, the predetermined time T after the human body detection sensor 453 does not detect the user existing in front of the toilet bowl 800, the predetermined time T after the entry detection sensor 451 does not detect the user, the predetermined time T after the toilet lid opening and closing detection sensor 457 detects the close of the toilet lid 300, the predetermined time T after the valve 413 closes, and the predetermined time T after the reserved water is secured.

Next, a description will be given of experiments which the inventors of the present invention carried out, with reference to the accompanying drawings.

FIG. 8 is a table showing results obtained by analyzing water quality of the tap water and the acidic electrolyzed water.

Further, FIGS. 9 to 12 are tables each exemplifying one example of results obtained by evaluating water scale removing capability in the present experiments.

In the following embodiment, evaluation was made using tiles (5 cm×5 cm) with a glaze layer formed on a surface thereof, the pH adjusted water described below as testing liquids, and an acidic electrolyzed water as a control. Sliding tests were conducted in the following embodiments as follows.

Nitric acid (a guaranteed reagent, manufactured by Wako Pure Chemical Industries, Ltd.) was added to common tap water to adjust the tap water to pH 1 to 6. The adjusted solutions were used as pH adjusted water. The results obtained by analyzing the water quality of the used tap water are shown in FIG. 8. An acidic electrolyzed water having the following composition was prepared by an electrolyzed water generator (TEK511, manufactured by TOTO LTD.).

Aluminum nitrate nonahydrate or copper nitrate hexahydrate (all products being guaranteed reagents, and manufactured by Wako Pure Chemical Industries, Ltd.) was dissolved in tap water to prepare solutions with metal ion concentrations regulated to 1000 ppm which were used as metal ion stock solutions. The metal ion stock solutions were diluted with the pH adjusted water (pH 1 to 6) to prepare solutions having adjusted metal ion concentrations (0.1, 0.5, 1, 5, and 10 ppm) and pH values (pH 1 to 6). These solutions were used as metal ion-added and pH-adjusted water.

A sliding test was carried out with a rubbing tester (manufactured by Taihei Rika Kogyo K. K.) by the following method. A sponge piece obtained by cutting a nonwoven fabric sponge Scotch-Brite (registered trademark) (SS-72K, manufactured by Sumitomo 3M Ltd.) into a size of 2.24 cm square was bonded with a pressure sensitive adhesive double coated tape to a head so that the nonwoven fabric part is brought into contact with a sliding surface, followed by wetting with distilled water. A water scale deposited part was observed under a digital microscope (VHX-900, manufactured by Keyence Corporation) at a magnification of 100 times. Next, a weight of 250 g was placed (loading conditions: 4.9 kPa), and sliding was performed ten times, followed by observation under the digital microscope under the same conditions as described above to determine whether or not the water scale had been removed. Sliding of 10 times under the loading conditions: 4.9 kPa corresponds to conditions for general cleaning of toilet bowls. The results were evaluated according to the following criteria.

◯: Water scale was removed by sliding of 10 times or less

χ: Water scale was remained even by sliding of 50 times

The water scale removing capability of the pH adjusted water was evaluated by the following method. At the outset, 20 μL of the pH adjusted water or the acidic electrolyzed water was dropped on the tile (5 cm×5 cm) with a glaze layer formed on the surface thereof, and the tile was thereafter allowed to stand at room temperature for 48 hours to dry and deposit the water scale on the tile. A sliding test was carried out thereafter. The results were as shown in FIG. 9.

The water scale removing capability was evaluated in the same manner as in the embodiment mentioned above in relation to FIG. 9 except that the aluminum ion-added and pH-adjusted water prepared by using aluminum nitrate nonahydrate was used as the testing solution. The results were as shown in FIG. 10.

The water scale removing capability was evaluated in the same manner as in the embodiment mentioned above in relation to FIG. 9, except that the copper ion-added and pH-adjusted water prepared by using copper nitrate hexahydrate was used as the testing solution. The results were as shown in FIG. 11.

Various metal ion stock solutions prepared by using aluminum nitrate nonahydrate or copper nitrate hexahydrate (all products being guaranteed reagents, and manufactured by Wako Pure Chemical Industries, Ltd.) were added in a proper amount to an acidic electrolyzed water produced with a commercially available electrolyzed water generator (TEK511, manufactured by TOTO LTD.) for dilution to target metal ion concentrations (0.1, 0.5, 1, 5, and 10 ppm) to prepare metal ion-added acidic electrolyzed water. The results obtained by analyzing the water quality of the use acidic electrolyzed water are shown in FIG. 8.

The water scale removing capability was evaluated in the same manner as in the embodiment mentioned above in relation to FIG. 9, except that the metal ion-added acidic electrolyzed water was used as the testing solution. The results were as shown in FIG. 12.

As mentioned above, according to the results of experiments in relation to FIGS. 8 to 12, it was known that the water scale removing capability is good in the water scale which was formed by the evaporation of the acidic water having pH adjusted to about 2.0 to about 5.0 and the acidic water containing the metal ion ($Al^{3+}$ and $Cu^{2+}$ in the present embodiment).

Next, a description will be given of experiments carried out by the inventors of the present invention with reference to the accompanying drawings.

FIG. 13 is a comparative table of the water scale formation in relation to irradiation of ultraviolet lights.

Figure 14A:
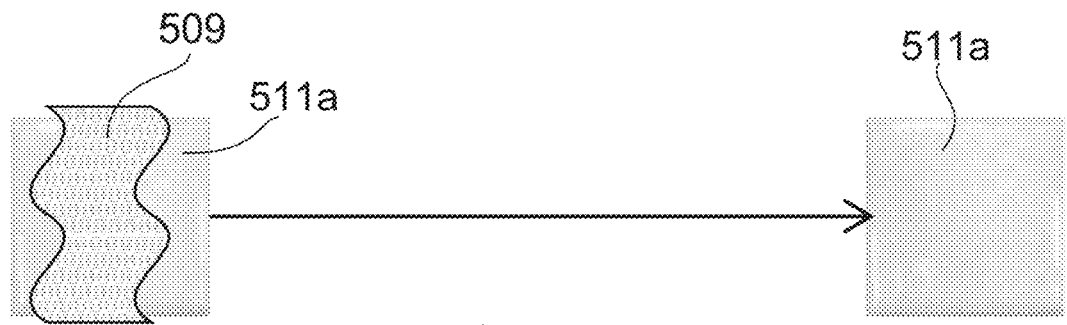
FIGS. 14A and 14B are schematic views for describing conditions for the present experiments.
Figure 14B:
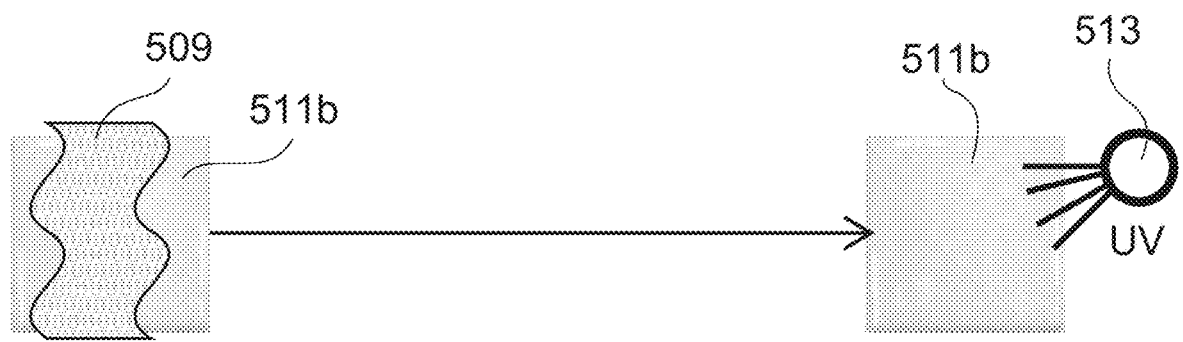
Figure 15:
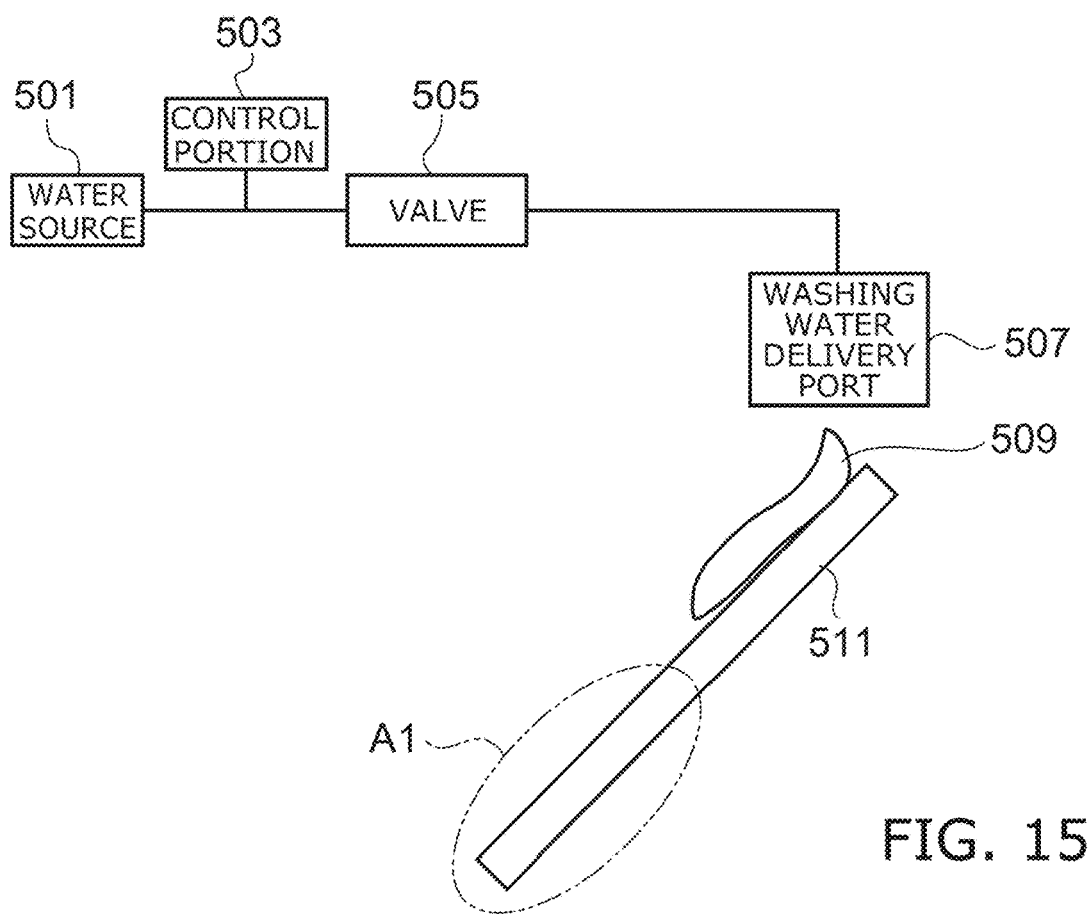
FIG. 15 is a schematic view for describing the conditions for the present experiments.

FIGS. 14 and 15 are schematic views for describing conditions for the present experiments.

As shown in FIG. 15, the inventors of the present invention first prepared a tile 511 having the photocatalyst layer formed on the surface thereof and arranged inclined. Subsequently, a valve 505 was opened by a control portion 503, and washing water 509 supplied from a water source 501 was delivered like shower from a washing delivery port 507 for about 5 seconds. Accordingly, a water film was formed on the surface of the tile 511.

Subsequently, as shown in FIG. 14A, a first tile 511a among a plurality of tiles 511 having the water film formed on the surface was left at room temperature for about 30 minutes and the surface thereof was evaporated. On the other hand, as shown in FIG. 14B, a second tile 511b among a plurality of tiles 511 having the water film formed on the surface was left at room temperature for about 30 minutes in a state in which the ultraviolet light was irradiated to the surface of the second tile 511b from a UV light source 513, and the surface thereof was evaporated.

Surface states (water scale formed states) of the first tile 511a and the second tile 511b after being evaporated are as shown in FIG. 13. "Photographs" shown in FIG. 13 are obtained by photographing the surfaces of the tiles in a range A1 shown in FIG. 15. "Water scale schematic view" shown in FIG. 13 schematically shows the water scale formed on the surface of the tile in "photograph" shown in FIG. 13.

Accordingly, a range of the water scale formed on the surface of the second tile 511b is wider than a range of the water scale formed on the surface of the first tile 511a. Therefore, it is known that if the ultraviolet light is irradiated to the water film in a state in which the water film is formed on the tap water (clean water), the polymerization of the silicic acid is promoted, that is, the water scale tends to be formed.

The description is given above of the embodiments according to the present invention. However, the present invention is not limited to the description. Appropriate design changes applied by those skilled in the art to the embodiments mentioned above are included in the scope of the present invention as long as the design changes have the features of the present invention. For example, shapes, dimensions, materials and arrangements of the respective elements provided in the toilet device 10 and the sanitary washing device 100, and installed modes of the spray nozzle 481 and the UV light source 483 are not limited to the exemplified ones, but can be appropriately modified.

Further, in the present embodiment, the description is given by exemplifying the case that the toilet bowl is the western style sitting toilet bowl (closet bowl), however, the urinal is included in the range of the toilet bowl according to the present embodiment.

Further, the respective elements provided in the embodiments mentioned above can be combined in a technically available range, and the combinations are included in the scope of the present invention as long as they include the features of the present invention.

What is claimed is:

1. A toilet device comprising:
   a washing unit washing a surface of a bowl in a western style sitting toilet bowl;
   a water supplying unit supplying washing water to the washing unit, the washing water being tap water;
   a washing nozzle configured to wash a buttock of a user seated on a toilet seat;
   an electrolysis tank configured to generate an acidic water and an alkaline water from the washing water;
   a metal ion water generating portion configured to generate a metal ion water from the acidic water supplied from the electrolysis tank, the metal ion water containing a metal ion,
   a spray portion configured to spray the metal ion water to a first portion of the surface of the bowl;

a first switch valve configured to switch a first state and a second state, the first state being a state that the washing water supplied from the water supplying unit is supplied to the washing nozzle, the second state being a state that the washing water supplied from the water supplying unit is supplied to the electrolysis tank;

a second switch valve provided between the electrolysis tank and the metal ion water generating portion, the second switch valve being configured to guide the acidic water supplied from the electrolysis tank to the metal ion water generating portion, the second switch valve being configured to guide the alkaline water supplied from the electrolysis tank to a second portion of the western style sitting toilet bowl, the second portion being different from the first portion;

a flow rate adjusting valve configured to supply the washing water supplied from the first switch valve to the washing nozzle, supply the metal ion water supplied from the metal ion water generating portion to the spray portion, and adjust a flow rate of the washing water and a flow rate of the metal ion water;

an entry detection sensor detecting the user entered a toilet room;

a seating detection sensor configured to detect a human body existing above the toilet seat just before the user seats on the toilet seat, or the user seated on the toilet seat; and a control portion configured to switch the first switch valve to the second state and spray the washing water from the spray portion to the surface of the bowl after the entry detection sensor detects the user, the control portion being configured to switch the first switch valve to the first state when the seating detection sensor detects the human body, the control portion being configured to a start a washing operation of the toilet bowl by the washing unit after the seating detection sensor detects leaving of the user from the toilet seat, the control portion being configured to switch the first switch valve to the second state and operate the electrolysis tank after the washing operation of the toilet bowl, the control portion being configured to spray the metal ion water from the spray portion to the washing water left on the surface of the bowl within a range of 30 seconds or more and less than 30 minutes from the end of the washing operation of the toilet bowl.

2. The toilet device according to claim 1, wherein the acidic water includes metal ion.

3. The toilet device according to claim 1, wherein acidity of the acidic water is pH 2.5-5.0.

4. The toilet device according to claim 2, wherein acidity of the acidic water is pH 2.5-5.0.

5. The toilet device according to claim 1, wherein a photocatalyst layer is formed on the surface of the bowl.

6. The toilet device according to claim 2, wherein a photocatalyst layer is formed on the surface of the bowl.

7. The toilet device according to claim 3, wherein a photocatalyst layer is formed on the surface of the bowl.

* * * * *

UNITED STATES PATENT AND TRADEMARK OFFICE
CERTIFICATE OF CORRECTION

PATENT NO. : 10,738,453 B2
APPLICATION NO. : 13/766176
DATED : August 11, 2020
INVENTOR(S) : Shinichi Yagi et al.

Page 1 of 1

It is certified that error appears in the above-identified patent and that said Letters Patent is hereby corrected as shown below:

In the Specification

Column 2, Line 14, "Fig. 5 is a tinning chart" should be --Fig. 5 is a timing chart--.

Column 2, Line 17, "Fig. 6 is a tinning chart" should be --Fig. 6 is a timing chart--.

Column 2, Line 20, "Fig. 7 is a tinning chart" should be --Fig. 7 is a timing chart--.

Column 9, Line 44, "a in oxide" should be --a tin oxide--.

Column 11, Line 64, "user (timing n2)," should be --user (timing t12),--.

Column 11, Line 66, "started (timing n3)." should be --started (timing t13).--.

Signed and Sealed this
Twelfth Day of January, 2021

Andrei Iancu
*Director of the United States Patent and Trademark Office*